Aug. 16, 1966     F. W. W. MORLEY     3,266,771
TURBINES AND COMPRESSORS
Filed Nov. 27, 1964
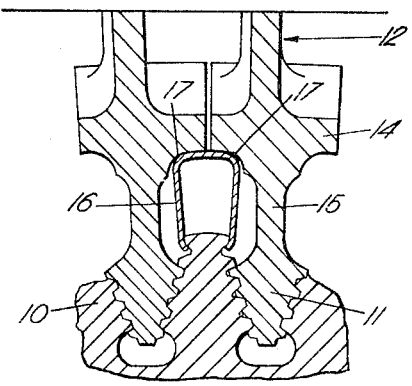
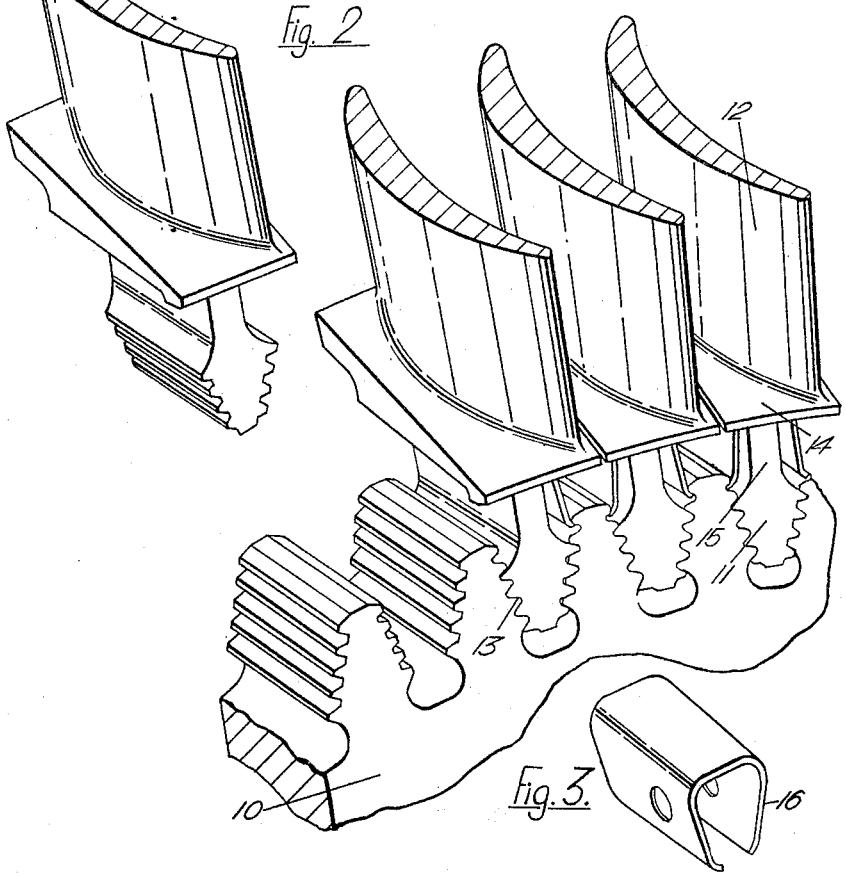
Inventor
Frederick William Walton Morley
By
Cushman, Darby & Cushman
Attorneys

United States Patent Office 3,266,771
Patented August 16, 1966

3,266,771
TURBINES AND COMPRESSORS
Frederick William Walton Morley, Castle Donington, England, assignor to Rolls-Royce Limited, Derby, England, a company of Great Britain
Filed Nov. 27, 1964, Ser. No. 414,241
Claims priority, application Great Britain, Dec. 16, 1963, 49,674/63
2 Claims. (Cl. 253—77)

This invention relates to turbine and compressors, and, although it is not so restricted, it is more particularly concerned with a turbine of a gas turbine engine.

According to the present invention there is provided a turbine or compressor having a rotor disc in which are mounted the root portions of a plurality of angularly spaced apart rotor blades, each said rotor blade having a platform which is disposed radially outwardly of and is connected to the respective root portion by a radially extending shank, and flexible means which in operation engage both the circumference of the rotor disc and the radially inner surface of each platform, said flexible means dampening the amplitude of the vibration of the rotor blades which occur in operation.

It is desirable to make the blade shanks thin in order to ensure that the natural frequency of vibration of the blade occurs during low rotational speed of the engine. This ensures that during engine operation the blades are not maintained at the natural frequency of vibration for any great length of time. If, for example, the natural frequency of vibration coincides with the rotational speed which the engine has during cruise conditions of flight, then the blades would be maintained at their natural frequency of vibration for long periods of time and very bad vibration would occur.

In the case of the present invention, however, if the blade shanks are made thin and their amplitude is large, the flexible means dampen the large amplitude of vibration.

The said flexible means preferably comprise a plurality of members each of which is adapted to engage the radially inner surfaces of the platforms of two adjacent rotor blades. Thus each said member may be constituted by a channel-shaped sheet metal member.

Preferably the flexible means are urged into engagement with the radially inner surface of each platform by centrifugal force during rotation of said rotor disc.

The invention is illustrated, merely by way of example, in the accompanying drawings, in which:

FIGURE 1 is a broken away cross-sectional view of part of a turbine according to the present invention, FIGURE 2 is a broken away perspective view of part of the turbine of FIGURE 1, and FIGURE 3 is a perspective view of a sheet metal member which forms part of the construction shown in FIGURES 1 and 2.

Referring to the drawings, a turbine of a gas turbine engine has at least one rotor disc 10 in which are mounted the root portions 11 of a plurality of angularly spaced apart rotor blades 12. Each root portion 11 is of "fir tree" formation and fits into a correspondingly shaped slot 13 in the respective disc 10.

Each of the rotor blades 12 has a platform 14 which is disposed radially outwardly of and is connected to the respectively root portion 11 by a radially extending shank 15.

The shank 15 of each rotor blade 12 is made thin in order to ensure that the natural frequency of vibration of the blade occurs during low rotational speed of the turbine rotor disc 10. This ensures that during engine operation the rotor blades 12 are not maintained at the natural frequency of vibration for any great period of time. If, for example, the natural frequency of vibration coincided with the rotational speed which the engine has under cruise conditions of flight, then the rotor blades 12 would be maintained at their natural frequency of vibration for long periods of time and very bad vibration would occur. If, however, the natural frequency of vibration of each rotor blade 12 is made to occur at low engine rotational speed, then the rotational speed which coincides with the natural frequency of vibration only occurs for a small period of time.

The turbine is provided with a plurality of channel-shaped sheet metal members 16 (best shown in FIGURE 3), each sheet metal member 16 being in spring loaded engagement with the circumference of the rotor disc 10 and being adapted to engage the radially inner surface 17 of the platforms 14 of two adjacent rotor blades 12 during rotation of the rotor disc 10. The side walls of the channel shaped sheet metal members 16 are spaced from the adjacent blade shanks 15 as shown in FIGURE 1 so that cooling air may, if desired, be directed through these spaces as well as between the side walls themselves. During rotation of the disc 10 centrifugal forces urge the sheet metal members 16 radially outwards so that they contact the radially inner surface 17 of the platforms 14.

The sheet metal members 16 friction dampen the large amplitude of vibration of the rotor blades 12 which occur in engine operation due to the thin shanks 15. The sheet metal members 16 still allow the rotor blades 12 to vibrate but with a small amplitude of vibration.

Hitherto, the minimum cross-sectional area of each shank 15 has been nearly as great as the maximum cross sectional area of the respective root portion 11, this construction having been necessary in order to prevent large amplitudes of vibration of the rotor blades 12 during engine operation. This, however, has resulted in the natural frequency of vibration of each blade 12 occurring at engine rotational speeds which are maintained for long periods of time and resulting in bad vibration.

It will also, be appreciated that the present invention permits lightening of the engine by reducing the thickness of the blade shanks 15 which is always, of course, important, in cases where the engine is employed for aircraft propulsion.

I claim:

1. A turbine having a rotor disc, a plurality of angularly spaced apart rotor blades having root portions mounted in the rotor disc, each of said rotor blades having a platform and a radially extending shank, the platform being disposed radially outwardly of and being connected to the respective root portion by the shank, and a plurality of flexible channel members being substantially U-shaped in section and each having side walls connected by a base wall, each of said channel members having the free ends of its side walls in spring loaded engagement with the circumference of said rotor disc and its side walls spaced from the shanks of adjacent blades, said flexible channel members being urged by centrifugal force during rotation of said rotor disc so that the base wall of the same engages the radially inner surface of each platform to thereby dampen vibration of the rotor blades which occur in operation.

2. A turbine as claimed in claim 1 in which the free ends of the side walls of each of said flexible channel members is in-turned and in which the circumference of said rotor disc is provided with means for receiving the in-turned ends of the side walls of the channel members.

(References on following page)

References Cited by the Examiner

UNITED STATES PATENTS

| | | |
|---|---|---|
| 2,937,849 | 5/1960 | Danforth. |
| 3,001,760 | 9/1961 | Guernsey et al. _____ 253—77 |
| 3,037,741 | 5/1962 | Tuft. |
| 3,119,595 | 1/1964 | Wilson et al. _____ 253—77 |

FOREIGN PATENTS 1,263,677   5/1961   France.

MARTIN P. SCHWADRON, *Primary Examiner.*

SAMUEL LEVINE, *Examiner.*

E. A. POWELL, *Assistant Examiner.*